United States Patent [19]
Hofmann et al.

[11] 3,772,068
[45] Nov. 13, 1973

[54] PROCESS FOR FLAMEPROOFING FIBRE MATERIALS OF POLYESTERS AND CELLULOSE

[75] Inventors: Peter Hofmann, Uznach; Herman Nachbur, Dornach, both of Switzerland

[73] Assignee: Ciba-Geigy AG, Basel, Switzerland

[22] Filed: Apr. 26, 1971

[21] Appl. No.: 137,628

[30] Foreign Application Priority Data
Apr. 27, 1970 Switzerland.......................... 6250/70

[52] U.S. Cl......... 117/136, 106/15 FP, 117/138.8 F, 117/143 A, 252/8.1
[51] Int. Cl............................................... C09d 1/00
[58] Field of Search.......... 117/136, 143 A, 138.8 F; 252/8.1; 106/15 FP

[56] References Cited
UNITED STATES PATENTS

| | | | |
|---|---|---|---|
| 3,374,292 | 3/1968 | Zahir................ | 117/136 X |
| 3,993,746 | 7/1961 | Miles et al. ..................... | 117/136 X |
| 3,084,072 | 4/1963 | Deeley............ | 117/137 X |
| 3,121,106 | 2/1964 | Nagy................ | 106/15 FP |

*Primary Examiner*—William D. Martin
*Assistant Examiner*—Theodore G. Davis
*Attorney*—Harry Goldsmith, Joseph G. Kolodny and Mario A. Monaco

[57] ABSTRACT

A process is provided for the flameproofing of polyester-cellulose fibre blends with aqueous preparations, which contain at least a tetrabis-(hydroxymethyl)-phosphonium salt, a phosphorus compound containing at least one radical of the formula

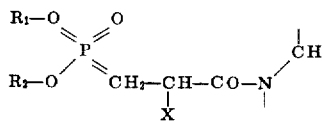

wherein $R_1$ and $R_2$ each denote an alkyl, alkenyl or halogenoalkyl radical with at most four carbon atoms and X denotes a methyl radical or a hydrogen atom, an aminoplast precondensate and optionally, an aliphatic or aromatic polyhalogenated phosphoric acid triester. The treated fibrous materials are dried and then subjected to a heat treatment.

18 Claims, No Drawings

PROCESS FOR FLAMEPROOFING FIBRE MATERIALS OF POLYESTERS AND CELLULOSE

The subject of the invention is a process for the flameproofing of fibre materials of polyester and cellulose, characterised in that these materials are treated with an aqueous preparation which contains at least 1.( a tetrakis-(hydroxymethyl)-phosphonium salt, 2.) a reaction product which contains at least one radical of the formula (1) 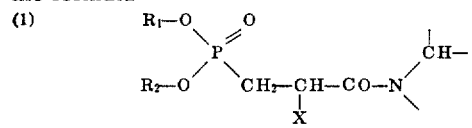

wherein $R_1$ and $R_2$ each denote an alkyl, alkenyl or halogenoalkyl radical with at most four carbon atoms and X denotes a methyl radical or preferably a hydrogen atom, 3.) an aminoplast precondensate and 4.) optionally, an aliphatic or aromatic polyhalogenated phosphoric acid triester, and that the materials thus treated are dried and subjected to a heat treatment.

Preferably, a tetrakis-(hydroxymethyl)-phosphonium halide, such as, for example, the bromide or especially the chloride, that is to say tetrakis-(hydroxymethyl)-phosphonium chloride (=THPC), is used as component (1).

The component (2) can be the most diverse reaction products which contain at least one radical of the formula (1).

Preferably, these radicals are radicals of the formula (2) 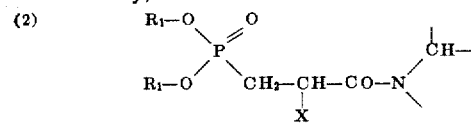

wherein $R_1$ and X have the indicated meaning.

Products of particular interest are reaction products which contain at least one radical of the formula (3) 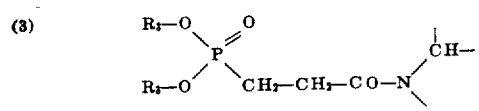

wherein $R_3$ denotes an ethyl or methyl radical, or especially of the formula (4) 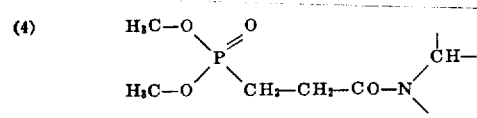

Many reaction products which can be employed as component (2) in accordance with the invention are known, for example:

1. French Patent Specification No. 1,422,893 describes polymeric and polymerisable phosphorus compounds.
2. N,N-Dimethylolcarboxylic acid amides are described in French Patent Specification No. 1,560,824.
3. French Patent Specification No. 1,577,573 refers to thiophosphonocarboxylic acid monomethylolamides and dimethylolamides and their ethers.

Reaction products of phosphonocarboxylic acid amides with glyoxal, formaldehyde, optionally with urea and optionally with an alcohol are described by French Patent Specification No. 1,576,727.

5. German Published Specification No. 1,933,479 describes reaction products of condensation products of 2 mols of a phosphonocarboxylic acid methylolamide or of 1 mol of phosphonocarboxylic acid amide with formaldehyde, and optionally with an alcohol.
6. French Patent Specification No. 1,395,178 and 1,524,670 describe the preferentially used phosphonocarboxylic acid methylolamides.
7. Aminoplasts containing phosphorus, that is to say the also preferred reaction products of aminoplast-forming compounds and phosphonocarboxylic acid amides, wherein one of these two components must be methylolated and optionally etherified, with formaldehyde and optionally an alkanol, are described in French Patent Specification No. 1,466,744 and in particular in German Published Specification No. 1,933,444.

Other reaction products which can be used in accordance with the invention as component (2) are, for example, the following products:

8. Phosphorus compounds with a hetero-ring containing eight ring members, corresponding to the formula (5) 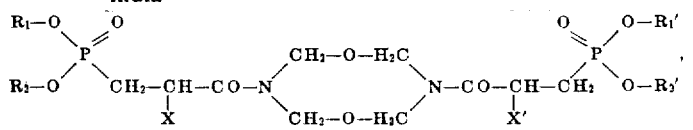

wherein $R_1$, $R_2$, $R_1'$ and $R_2'$ each denote an alkyl, halogenoalkyl or alkenyl radical with at most four carbon atoms each, and X and X' each denote a methyl radical or preferably a hydrogen atom. Compounds of the formula (5) are appropriately manufactured by reacting 2 mols of the corresponding phosphonocarboxylic acid amide with at least 4 mols of anhydrous formaldehyde in the presence of an acid catalyst, in the absence of water, and at elevated temperature.

9. Further suitable reaction products are phosphorus compounds of the formula (6) 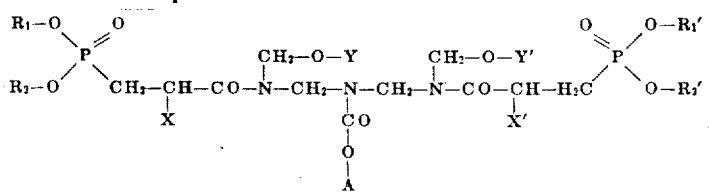

wherein $R_1$, $R_2$, $R_1'$, $R_2'$, X and X' have the indicated meaning, Y and Y' represent an alkyl radical with at most four carbon atoms or preferably a hydrogen atom and A represents an alkyl radical with one to 22 carbon atoms, a halogenoalkyl radical with at most four carbon atoms, a hydroxyalkyl radical with at most four carbon atoms, an alkenyl radical with two to 22 carbon atoms or an optionally halogenated benzene or benzyl radical. These compounds are appropriately manufactured by first condensing 2 mols of the corresponding phosphono-carboxylic acid amide with 1 mol of the corresponding carbamate, one of these starting components being methylolated, and subsequently reacting the product, at elevated temperature, with formaldehyde, and thereafter optionally still etherifying the product with an alkanol. Preferably, lower alkyl carbamates are used for the process.

10. It is also possible to use phosphorus compounds of the formula (7) 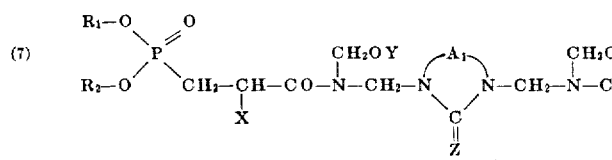

wherein $R_1$, $R_2$, $R_1'$, $R_2'$, X, X' and Y have the indicated meaning and $A_1$ represents an alkylene radical with two to three carbon atoms which is optionally substituted by lower alkyl, lower alkoxy or hydroxyl groups, and Z represents an oxygen or sulphur atom. These compounds are appropriately manufactured by reacting 1 mol of a condensation product of 2 mols of the corresponding phosphonocarboxylic acid amide with 1 mol of the corresponding cyclic diamine, one of these starting components being methylolated and optionally etherified, with formaldehyde at elevated temperature, and subsequently optionally reacting the product with an alkanol.

11. Further suitable reaction products correspond to the formula (8) 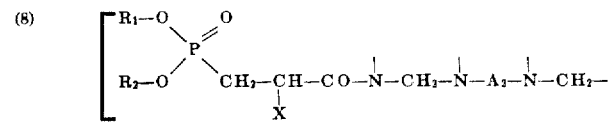

wherein $R_1$, $R_2$, $R_1'$, $R_2'$, ; X, X' and Y have the indicated meaning and $A_2$ represents a radical of the formula —CO—, —CS—, —SO$_2$—, —CNH— or —CO—NE—CO—, wherein E denotes a hydrogen atom or a radical of the formula —CH$_2$—O—Y. These phosphorus compounds are appropriately manufactured by reacting 1 mol of a condensation product of 2 mols of a corresponding phosphonocarboxylic acid amide and 1 mol of urea, thiourea, sulphamide, guanidine or biuret, one of the two starting components being methylolated, at elevated temperature with 2 to 3 mols of formaldehyde and optionally an alkanol. A possible compound is in this case, for example, the compound of the formula (9) 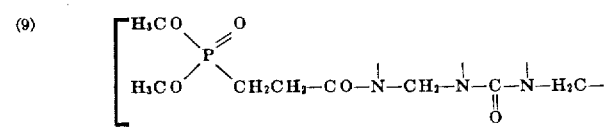

12. Moreover, it is also possible to use phosphorus compounds of the formula

(10) 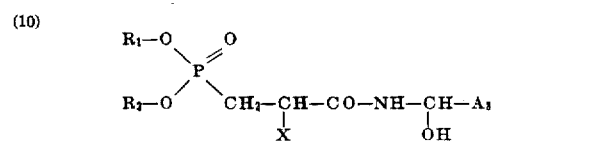

wherein $R_1$, $R_2$ and X have the indicated meaning and $A_3$ denotes a halogenated alkyl radical or benzene radical. These phosphorus compounds are appropriately manufactured by reacting the corresponding phosphonocarboxylic acid amide with a halogenoaldehyde of the formula

(11) 

or its hydrate, wherein $A_3$ has the indicated meaning, in an inert organic solvent at elevated temperature.

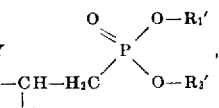

However, reaction products of the nature described under Nos. 6 and 7 are preferentially used.

The reaction products according to No. 6 are, in particular, phosphonocarboxylic acid methylolamides of the formula

(12) 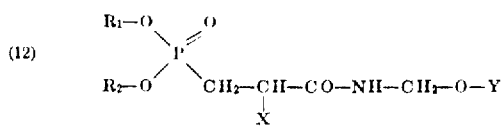

wherein $R_1$, $R_2$, X and Y have the indicated meaning. Amongst these compounds, those of the formula

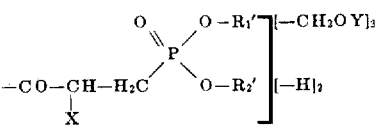

(13) 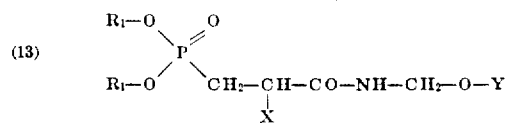

wherein $R_1$, X and Y have the indicated meaning, are preferred.

Particularly suitable compounds are, however, those of the formula

(14) 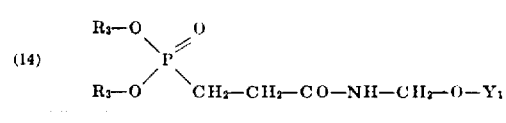

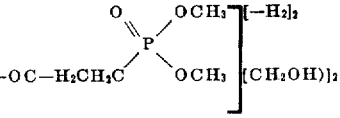

and especially of the formula

(15) 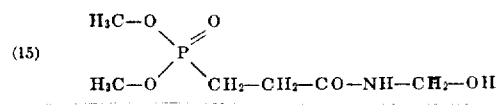

wherein $R_3$ has the indicated meaning and $Y_1$ denotes a methyl group or preferably a hydrogen atom.

The reaction products described under No. 7 are preferably those from (a) a nitrogen compound which can be at least dimethylolated, (b) a compound of the formula

(16) 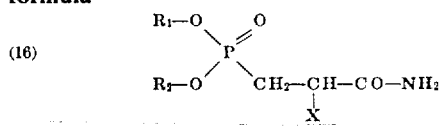

wherein $R_1$, $R_2$ and X have the indicated meaning, (c) formaldehyde or a formaldehyde-releasing agent and (d) optionally, an alkanol with at most four carbon atoms.

These reaction products used for the process according to the invention can be obtained by reaction of the components (a), (b), (c) and optionally (d) in the most diverse sequences. For example, it is possible first to react the components (a), (b) and (c) simultaneously with one another and subsequently optionally further to etherify the product with the component (d).

Another possibility is to allow the component (a) to react with the component (c), then with the component (b) and thereafter optionally with the component (d). Furthermore, these reaction products can be obtained by reaction of the component (a) with the component (c), then with the component (d) and thereafter with the component (b). Moreover, such reaction products are obtained if first the components (a) and (b) are each individually reacted with the component (c), then the two reaction products are reacted with one another, and thereafter the product is optionally further reacted with the component (d). Additionally it is also possible first to react the component (b) with the component (c) and optionally with the component (d), and then to allow the product thus obtained to react with the component (a).

Suitable nitrogen compounds which can be at least dimethylolated [= component (a)] are compounds which can be converted, by addition of formaldehyde, into so-called curable aminoplast precondensates. The following may be mentioned: 1,3,5-aminotriazines such as N-substituted malamines, for example N-butylmelamine, as well as ammeline. guanamines, for example formoguanamine, benzoguanamine, acetoguanamine and also diguanamines. Further possibilities are: biuret, guanidine, thiourea, alkylureas or arylureas and alkylthioureas or arylthioureas, alkyleneureas or alkylenediureas, for example ethyleneurea, propyleneurea or acetylenediurea; 4,5-dihydroxy-imidazolidone-2 and derivatives thereof, for example, 4,5-dihydroxyimidazolidone-2 substituted in the 4-position, at the hydroxyl group, by the radical —CH$_3$CH$_2$CO—NH—CH$_2$—OH. Further possibilities are also cyclic nitrogen compounds, for example of the formulae

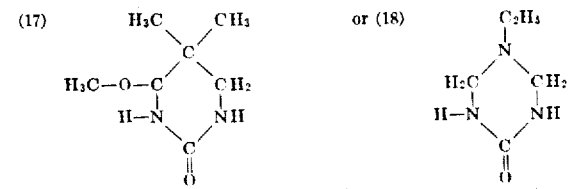

However, 1,3,5-triazines substituted by at least two primary amino groups, urea and the compound of the formula (17) are preferred. Melamine is of particular interest.

The component (b) preferably corresponds to the formula

(19) 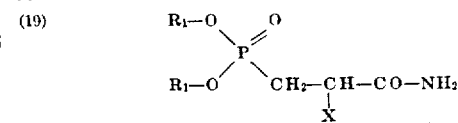

wherein $R_1$ and X have the indicated meaning.

Components (b) which correspond to the formula

(20) 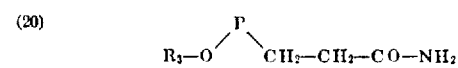

wherein $R_3$ denotes an ethyl or methyl radical, are of particular interest.

Amongst the compounds of the formula (20), 3-(dimethylphosphono)-propionic acid amide has proved particularly advantageous.

Reaction products of hexamethylolmelamine or hexamethylolmelamine-pentamethyl-ether and 3-(dimethyl-phosphono)-propionic acid amide, and optionally formaldehyde, have, above all, proved very suitable reaction products for use as component (2) in the process according to the invention.

Other preferred components (2) are reaction products of dimethylolmelamine or hexamethylolmelamine and 3-(di-methylphosphono)-propionic acid methylolamide.

These reaction products can furthermore also correspond to the formula

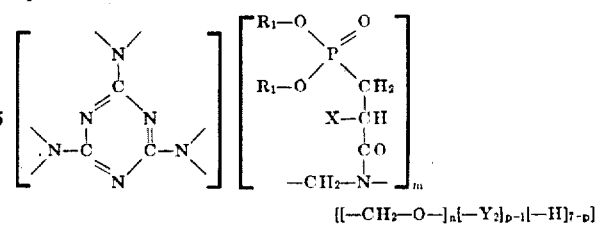

$[[—CH_2—O—]_n[—Y_2]_{p-1}[—H]_{r-p}]$ wherein $R_1$ and X have the indicated meaning, $Y_2$ denotes an alkyl group with at most four carbon atoms and $m$, $n$ and $p$ each denote a positive integer, with $m$ having a value of 4 to 6, $n$ having a value of 3 or 4 and $p$ having a value of at most $n + 1$. For example, such a compound can be the compound of the formula (22)

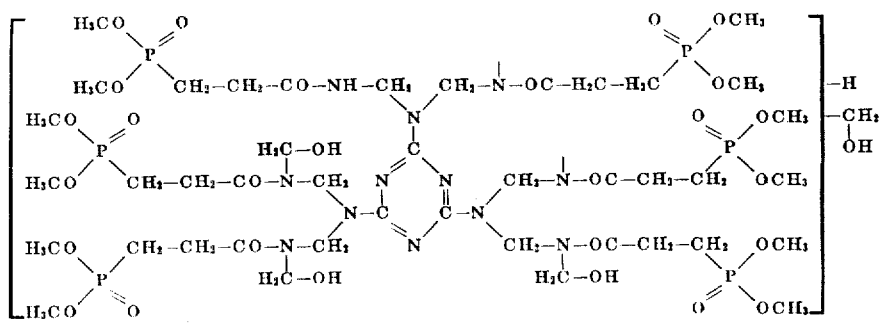

The reaction products of the formula (21) are conveniently obtained if a compound of the formula (16) is condensed with a 1,3,5-triazine containing at least two primary amino groups, it being necessary for the H₂N groups of one of these two starting components to be methylolated, whilst warming, preferably in the presence of an organic solvent which forms an azeotrope with water, the product is post-methylolated with formaldehyde or a formaldehyde-releasing agent at elevated temperature, optionally in the presence of a basic catalyst, and this product is optionally subsequently still etherified with an alkanol containing at most four carbon atoms.

The post-methylolations with formaldehyde or a formaldehyde-releasing agent such as paraformaldehyde advantageously take place at temperatures of up to 150°C. Possible catalytically acting bases which are optionally conjointly used are, for example, sodium hydroxide, potassium hydroxide, sodium acetate, magnesium carbonate or magnesium oxide.

A preferred embodiment for the manufacture of the reaction products consists of reacting a compound of the formula (16) with a methylolated, optionally etherified component (a) in the melt, that is to say in the absence of a solvent, at temperatures of 100° to 150°C.

Reaction products according to No. 6 or according to the formula (13) are preferably used together with the components (1) and (3) and without the component (4). Reaction products according to No. 7 or reaction products from components (a), (b), (c) and optionally (d), on the other hand, are preferably used together with the components (1), (3) and (4).

By aminoplast precondensates used as component (3), there are understood addition products of formaldehyde to nitrogen compounds which can be methylolated. The following may be mentioned: 1,3,5-aminotriazines such as N-substituted melamines, for example N-butylmelamine, N-trihalogenomethyl-melamines as well as ammeline, guanamines, for example benzoguanamine or acetoguanamine, or also diguanamines. Further possibilities are also: alkylureas or arylureas and alkylthioureas or arylthioureas, alkyleneureas or alkylene-diureas, for example ethyleneurea or propyleneurea, acetylene-diurea or especially 4,5-dihydroxyimidazolidone-2 and derivatives thereof, for example 4,5-dihydroxyimidazolidone-2 substituted in the 4-position, at the hydroxyl group, by the radical —CH₂CH₂CO—NH—CH₂—OH. The methylol compounds of a urea, of an ethylene urea or of melamine are preferentially used. Both the predominantly monomolecular and the more highly precondensed compounds are suitable as starting products.

Ethers of these aminoplast precondensates can also be employed. Ethers of alkanols such as, for example, methanol, ethanol, n-propanol, isopropanol, n-butanol or pentanols are advantageous. It is however desirable for these aminoplast precondensates to be soluble in water, such as, for example, dimethylolmelamine or the pentamethylolmelamine-dimethyl-ether.

The component (4) can be mixed or individual polyhalogenated triesters of phosphoric acid. If they are conjointly used at all, 50 to 200 g/l, preferably 70 to 140 g/l, are appropriately used.

Polyhalogenated phosphoric acid triaryl esters or above all trialkyl esters are preferably used as component (4). Trialkyl esters which are particularly suitable are those which contain at most four carbon atoms in the alkyl radical and wherein each alkyl radical is substituted by 2 or 3 halogen atoms, for example bromine atoms or chlorine atoms. Tris-(2,3-dibromo-2-chloropropyl)-phosphate or especially tris-(2,3-dibromopropyl)-phosphate may here be specifically mentioned as component (4). Additionally, however, triaryl esters, such as tris-(polybromo-aromatic) phosphates, for example polybrominated triphenylphosphate or tricresylphosphate should also be mentioned.

The aqueous preparations for flameproofing polyester-cellulose fibre materials as a rule contain 180 to 320 g/l, preferably 200 to 285 g/l, of the component (1), 30 to 220 g/l, preferably 40 to 200 g/l, of the component (2), 10 to 90 g/l, preferably 20 to 50 g/l, of the component (3) and 0 to 200 g/l, perferably 0 to 140 g/l, of the component (4). It is advisable so to match the quantity ratios of the individual components that the preparations contain about 55 to 65 g/l of phosphorus and about 15 to 30 g/l of nitrogen (without counting other nitrogen-containing constituents). The aqueous preparations are obtained by simply mixing the components (1) to (4) and adding an appropriate amount of water. In the undiluted state, the mixtures of the components (1) to (4) are viscous, and on dilution with water finely disperse emulsions of good stability result.

The preparations for flameproofing can optionally contain yet further additives. To achieve a greater deposit of substance on fabrics it is, for example, advantageous to add from 0.1 to 0.5°/₀₀ of a high molecular polyethylene glycol. Furthermore, the customary plasticisers can be added to the preparations. Favourable effects can also be achieved if aminoplast-forming compounds such as, for example, urea are conjointly used. An addition of curing catalysts, such as, for example, ammonium chloride, ammonium dihydrogen orthophosphate, phosphoric acid, magnesium chloride or zinc nitrate is also possible but is in most cases not necessary, since the reaction products to be used according to the invention in most cases cure of their own accord at higher temperatures. The addition of an emulsifier is frequently not necessary, since the phosphorus-containing reaction products [component (2)] in part are themselves very effective emulsifiers for the polyhalogenated phosphoric acid esters. It frequently proves advantageous to add buffer substances, such as, for example, trisodium phosphate or triethanolamine, to the preparation.

The fibre materials to be provided with a flameproof finish in accordance with the invention are preferably textiles. In particular, polyester-cellulose mixed fabrics are used, wherein the ratio of the polyester component to the cellulose component is from 1:4 to 2:1. Thus, for example, so-called 20/80, 26/74, 50/50 or 67/33 polyester-cellulose mixed fabrics can be used.

The preparations are now applied to the mixed fibre materials of polyester and cellulose, and this can be performed in a manner which is in itself known. Preferably, piece goods are used and impregnated with a padder of the customary construction, which is fed with the preparation at room temperature. The cellulose components of mixed fibre materials can be based on natural or regenerated cellulose, for example linen, cotton, rayon or viscose staple.

The fibre material impregnated in this way must now be dried, and this is preferably done at temperatures of up to 100°C. It is then subjected to a heat treatment at temperatures above 100°C, for example between 130° and 200°C, preferably at 140° to 180°C, the duration of which can be the shorter, the higher is the temperature. This duration of heating is, for example, 2 to 6 minutes at temperatures of 180° to 140°C.

A rinse with an acid-binding agent, preferably with aqueous sodium carbonate solution, for example at between 40°C and the boiling point, and for 40 to 3 minutes, is advisable in the case of a strongly acid reaction medium.

The process according to the invention yields fibre materials having a very good permanent flameproof character.

As a rule, the fabrics finished in accordance with the invention showed a pleasant, barely stiffened, fabric handle.

The percentages and parts in the examples which follow are percentages by weight and parts by weight, respectively. The relation of parts by volume to parts by weight is as of ml to g.

Manufacturing Instructions

Example 1

211 parts (1 mole) of 3-(dimethylphosphono)-propionic acid methylolamide and 71 parts (0.166 mol) of a 90 percent strength hexamethylolmelamine-pentamethyl-ether are reacted in a 500 parts by volume stirred flask, equipped with a reflux condenser and thermometer, for a total of 50 minutes at 118 to 125°C. After the end of the first 30 minutes reaction time, the apparatus is placed under vacuum and the methanol produced is distilled off. This treatment is carried out for a further 20 minutes, after which the mixture is immediately cooled to room temperature.

Product A is obtained as a colourless, clear, viscous syrup which contains practically 100 percent of active substance.

Example 2

59 parts of glyoxalurea (glyoxalmonourein) and 181 parts of 3-dimethylphosphonopropionamide are heated to 115°C in a reaction vessel of 500 parts by volume capacity, equipped with a stirrer, and after a few minutes the resulting melt is again cooled to room temperature. Thereupon, 162 parts of 37 percent strength aqueous formaldehyde solution are added and the resulting solution is adjusted to a pH value of 9 with 30 percent strength sodium hydroxide solution. Methylolation is carried out at room temperature for 6 hours at this pH, whilst stirring. 400 parts of an orange-yellow, clear solution are obtained. The solids content is 73 percent. On the basis of the content of free formaldehyde found, a phosphorus-containing reaction product which contains the trimethylol compound of the probable formula (101)

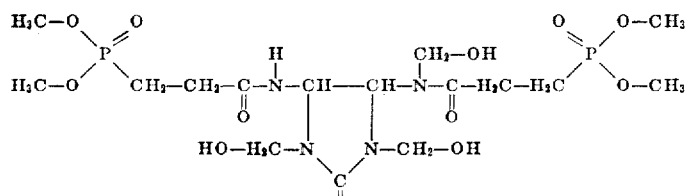

has formed to the extent of 75 percent. A 60 percent strength aqueous solution (Product B) is used for application.

Example 3

362 parts (2 mols) of 3-dimethylphosphonopropionamide and 422 parts (2 mols) of 3-dimethylphosphonopropionic acid methylolamide are suspended in 1,000 parts of toluene in a stirred flask of 2,500 parts by volume capacity, equipped with a water separator. Four parts of p-toluenesulphonic acid are further added, and the mixture is heated to the boiling point of the toluene, whilst azeotropically removing the water formed during the condensation and collecting it in the water separator. After 3½ hours' reaction time, no further water is formed. Thirty-three parts of water (calculated, 36 parts), are obtained. The toluene is thereafter removed in vacuo, 123 parts of 97.5 percent strength paraformaldehyde (4 mols) and 6 parts of solid sodium methylate are added to the melt which is left and the whole is heated to 100°C internal temperature for 30 minutes whilst stirring, the water separator having beforehand been replaced by a reflux condenser. The mixture is then cooled to 60°–65°C and 800 parts of methanol are added. The whole is cooled to 10°C whilst stirring rapidly, and unreacted paraformaldehyde which has separated out is filtered off. The filtrate is concentrated in vacuo at 40°C.

860 parts of a clear, yellowish syrup are obtained, which has a solids content of 96.3 percent.

Total — $CH_2O$ content = 50.3 parts
Free — $CH_2O$ content = 1.3 parts
Bonded — $CH_2O$ content = 49 parts;

this probably corresponds to an 81 to 82 percent formation of the monomethylol compound of the formula (102)

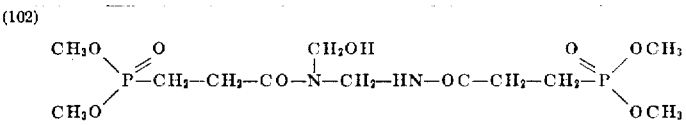

The product is applied as an aqueous solution of 72 percent content (Product C).

Example 4

181 parts (1 mol) of 3-(dimethylphosphono)-propionic acid amide, 123 parts (4 mols of $CH_2O$) of 97.5 percent strength paraformaldehyde and 0.9 parts of p-toluenesulphonic acid monohydrate are warmed to 100°C internal temperature, whilst stirring, in a 500 parts by volume stirred flask equipped with a condenser and thermometer, and are kept for 6 hours at this temperature. After this time, a sample of the reaction product shows, in a thin layer chromatogram, that practically all 3-(dimethylphosphono)propionic acid amide has reacted. The mixture is cooled to 60°C, 300 parts of methanol are added, and the whole is cooled to 15°C whilst stirring rapidly. Thereafter the free paraformaldehyde is filtered off and the methanol is removed in vacuo.

246 parts of a yellowish, clear product of low viscosity are obtained, which contains 100 percent of active substance and corresponds to the formula (103) 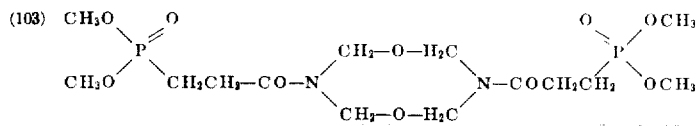

(Product D).

Example 5

220 parts (~1 mol) of 96 percent strength 3-[dimethyl-phosphono]-methylolpropionamide, prepared by methylolation of 3-(dimethylphosphono)propionamide, and 37.5 parts (0.5 mol) of methylcarbamate, in the presence of 1.2 parts of p-toluenesulphonic acid and 200 parts of benzene, are brought to the boil under reflux, with rapid stirring, in a 500 parts by volume stirred flask equipped with a water separator and a thermometer. 20 parts of water of condensation are formed in this manner over the course of 12 hours, and collected in the water separator. After this time, no further water is formed. The benzene is distilled off, and thereafter 30.7 parts (~1 mol) of paraformaldehyde (97.5 percent strength) and 2 parts of magnesium oxide are added at 50°C. The mixture is then heated to 100°C and kept at this temperature for 30 minutes, after which it is cooled to room temperature. It is then diluted with 250 parts of methanol, the solution is clarified by filtration, and the methanol is removed in vacuo.

230 parts of a colourless syrup are obtained, which gives a clear solution, of neutral reaction, in water, and which corresponds to the formula (104) 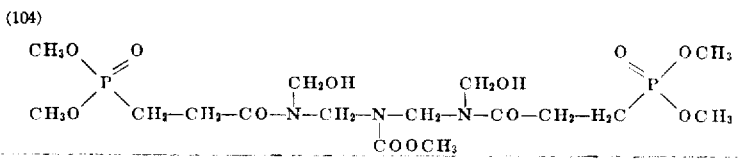

(Product E).

Example 6

660 parts (3 mols) of 96 percent strength 3-[dimethyl-phosphono]-methylolpropionic acid amide, 150 parts (1.5 mol) of propyleneurea and 4 parts of p-toluenesulphonic acid monohydrate in 500 parts of benzene are rapidly heated to refluxing in a 2,000 parts by volume stirred flask equipped with a water separator and thermometer. A total of 47 parts of water of condensation are formed in this way over the course of 24 hours, and collected in the water separator. After this time, no further water is formed. The benzene is distilled off as far as possible, and the residue is cooled to 50°C. Thereafter, 247 parts of aqueous formaldehyde solution (36.4 percent strength) are added and methylolation is carried out for 3 hours at 60°C and a pH value of 8.5 to 9. The pH value is kept constant by gradual addition of a total of 10 parts of 40 percent strength sodium hydroxide solution. After cooling, 980 parts of a clear, colourless product of low viscosity are obtained, which has a solids content of 71.7 percent. For application, the product is concentrated to 80 percent of solids content. The reaction product corresponds to the formula (105) 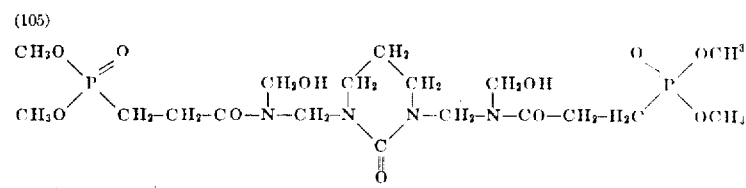

(Product F).

Example 7

186 parts (0.88 mol) of 3-(dimethylphosphono)-propionic acid methylolamide are reacted with 96 parts (0.44 mol) of a compound of the formula (106) 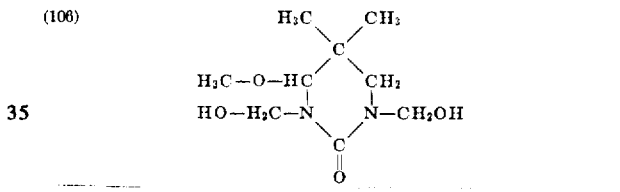

for 2 hours at 115 to 120°C internal temperature, in a 500 parts by volume stirred flask equipped with a reflux condenser and thermometer. A yellow syrup of 100 percent solids content is obtained; (Product G).

Example 8

60 parts (0.5 mol) of dimethylolurea and 181 parts (1 mol) of 3-(dimethylphosphono)-propionic acid amide are suspended in 200 parts of toluene in the apparatus described in Example 3, and condensed in the usual manner. The theoretical quantity of 18 parts of water is obtained within 4 hours. Thereafter the mixture is cooled and the residual formaldehyde content is determined. This is still 3 parts.

61.5 parts (2 mols) of 97.5 percent strength paraformaldehyde and 6 parts of sodium methylate powder are then added and post-methylolation carried out for 2 hours at 100°C. Thereafter the mixture is cooled and diluted with 150 parts of methanol, excess formaldehyde is filtered off and the methanol is removed in vacuo at 40°C.

A colourless, clear, water-soluble 100 percent strength product of medium viscosity is obtained, which on the basis of the formaldehyde content determined corresponds to the following formula:

(107)

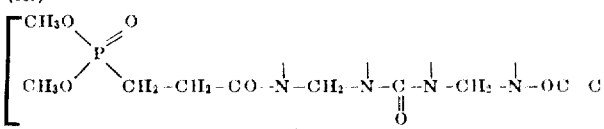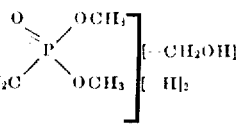

(Product H).

Example 9

4.35 mols of sodium methylate in 35 ml of methanol are added to 250 ml of dioxane which contains 72 g (1 mol) of acrylamide and 162 g (1 mol) of diallyl phosphite. After adding 32 ml of the sodium methylate solution, the temperature is raised to 80°–90°C through an exothermic reaction starting in the reaction mixture. The remainder of the sodium methylate solution is added slowly when the exothermic reaction subsides. After completion of the reaction, the mixture is cooled and the intermediate product is filtered off. After washing with benzene and subsequently drying, 213.2 g of an intermediate product are obtained.

119 g of this intermediate product are reacted with 41 g of a 36.5 percent strength formaldehyde solution at 55° to 60°C. During the reaction, the pH value is kept at 7.5 to 8 by adding alkali. After 2 hours, the reaction mixture is cooled to room temperature and filtered. An 82 percent strength solution of N-(hydroxymethyl)-3-(diallylphosphono)-propionamide is obtained; (Product I).

Example 10

211 parts (1 mol) of 3-[dimethylphosphono]propionic acid methylolamide (anhydrous product), 72.5 parts of 98 percent strength acrylamide (1 mol), 0.15 part of hydroquinone-monomethyl-ether and 1 part of p-toluenesulphonic acid in 200 parts of benzene are brought to the boil under reflux, with vigorous stirring, in a stirred vessel of 500 parts by volume capacity, equipped with reflux condenser, thermometer and water separator, and are kept under these conditions until no further water is produced. 16 parts of water are obtained, corresponding to a conversion of 89 percent of theory. The reaction mixture is thereafter cooled to room temperature and slowly poured into 2,000 parts by volume of acetone, and the polymeric constituents which have precipitated are suspended in a fine form by means of a high speed stirrer. After filtering off these polymeric constituents (30 parts), the filtrate is freed of benzene and acetone in vacuo at 50°C. 227 parts of a colourless liquid of low viscosity (100 percent solids content) are obtained. The product can be easily polymerised in aqueous solution at 70°C in the presence of a trace of ammonium persulphate. The product corresponds to the formula (108)

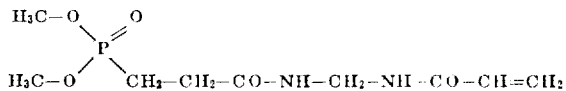

(Product K).

Example 11

181 parts of 3-(dimethylphosphone)-propionic acid amide, 96 parts of paraformaldehyde (97.5 percent strength) and 0.6 part of magnesium oxide are heated to 100°C in a 500 ml flask equipped with a stirrer, reflux condenser and thermometer. A cloudy melt is produced, which is stirred for 30 minutes at this temperature and then cooled to room temperature. A syrup of practically 100 percent solids content is produced.

A formaldehyde determination shows that the 3-(dimethylphosphonic acid)-propionic acid-N,N-dimethylolamide is present in a yield of 83 percent; (Product L).

APPLICATION EXAMPLES

Example 12

An undyed 50:50 polyester-cotton fabric is padded with liquors I to XV of Table I below, and dried at 80° to 100°C. Thereafter curing takes place for 4½ minutes at 160°C.

The fabrics are rinsed for 5 minutes at 60°C in a detergent solution which contains 4 g/l of sodium carbonate and 2 g/l of a condensation product of 1 mol of p-tert.-nonylphenol and 9 mols of ethylene oxide.

A part of this fabric is now washed 5 times or 10 times for 30 minutes in a solution at 60°C which contains 2 g of anhydrous sodium carbonate and 5 g of soap per litre of water ( = SNV—3 wash).

The individual pieces of fabric are then tested for their flameproof character (DIN 53,906 vertical test, 8 seconds ignition time). The results of this test are summarised in Table II.

TABLE I

| Constituents (amounts in g./l.) | Treated with liquor | | | | | | | | | | | | | | |
|---|---|---|---|---|---|---|---|---|---|---|---|---|---|---|---|
| | I | II | III | IV | V | VI | VII | VIII | IX | X | XI | XII | XIII | XIV | XV |
| THPC, 80% | 330 | 350 | 330 | 330 | 330 | 330 | 330 | 330 | 330 | 330 | 350 | 350 | 375 | 330 | 330 |
| Product A, 100% | 90 | 56 |  | 92 | 92 | 92 | 92 | 92 | 89 | 89 | 67 | 67 | 44 |  |  |
| 3-(dimethylphosphono)-propionic acid methylolamide, 80% |  |  | 51 |  |  |  |  |  |  |  |  |  |  | 125 | 125 |
| Tris-2,3-dibromopropylphosphate | 73 | 44 | 67 | 73 | 73 | 73 | 73 | 73 | 71 | 71 | 133 | 83 | 74 |  |  |
| Dimethylolmelamine | 33 | 30 | 33 | 33 |  | 33 | 33 | 33 | 30 | 30 | 30 | 40 | 46 | 42 | 42 |
| Dimethylolglyoxalmonourein, 40% |  |  |  |  | 210 |  |  |  |  |  |  |  |  |  |  |
| Urea |  |  |  |  |  | 30 |  | 30 |  | 30 |  |  |  |  | 30 |
| H₃PO₄, 85% | 5.5 |  |  |  |  |  |  |  |  |  |  |  |  |  |  |
| Triethanolamine |  |  |  |  |  |  | 30 | 30 |  |  |  |  |  |  |  |
| Na₃PO₄ |  |  |  |  |  |  |  |  | + | + |  | + | + | + | + |
| pH of the liquor | 2.5 | 3.8 | 4 | 3.8 | 2.3 | 3.7 | 4.8 | 4.8 | 5.5 | 5.5 | 5.5 | 5.5 | 5.5 | 5.5 | 5.5 |
| G./l.: |  |  |  |  |  |  |  |  |  |  |  |  |  |  |  |
| P | 57.5 | 54 | 52 | 57.5 | 57.5 | 57.5 | 57.5 | 57.5 | 57.5 | 57.5 | 59.5 | 57.5 | 57.5 | 57.5 | 57.5 |
| N | 24 | 18.5 | 22 | 24 | 24 | 24 | 38 | 24 | 38 | 22 | 36 | 20 | 24 | 24 | 38 |
| Br | 51.5 | 31 | 46 | 50.5 | 50.5 | 50.5 | 50.5 | 50.5 | 49 | 49 | 92 | 50.5 | 50.5 |  |  |

TABLE II

| Flameproof character | Untreated | Treated with liquor | | | | | | | | | | | | | |
|---|---|---|---|---|---|---|---|---|---|---|---|---|---|---|---|
| | | I | II | III | IV | V | VI | VII | VIII | IX | X | XI | XII | XIII | XIV | XV |
| After rinse: | | | | | | | | | | | | | | | | |
| Ignition time, sec. | Burns | 0 | 0 | 0 | 0 | 0 | 0 | 0 | 0 | 0 | 0 | 0 | 0 | 0 | 0 | 0 |
| Tear length, cm. | | 7.5 | 10 | 11 | 10 | 10 | 7.5 | 7 | 9 | 8.5 | 9.5 | 8 | 9.5 | 10 | 9.5 | 8 |
| After 5×SNV-3: | | | | | | | | | | | | | | | | |
| Ignition time, sec. | do | 0 | 0 | 0 | 0 | 0 | 0 | 0 | 0 | 0 | 0 | 0 | 0 | 0 | 0 | 0 |
| Tear length, cm. | | 10 | 11 | 11.5 | 11 | 10 | 9 | 7.5 | 8.5 | 8.5 | 8.5 | 8.5 | 10 | 10 | 10 | 10.5 |
| After 10×SNV-3: | | | | | | | | | | | | | | | | |
| Ignition time, sec. | do | 0 | 0 | 0 | 0 | 0 | 0 | 0 | 0 | 0 | 0 | 0 | 0 | 0 | 0 | 0 |
| Tear length, cm. | | 9.5 | 10.5 | 8 | 9.5 | 10 | 8 | 7 | 9.5 | 8.5 | 8.5 | 8.5 | 8.5 | 8 | 7.5 | |

Example 13

An undyed 67:33 polyester-cotton fabric is padded with liquors I to XI of Table III below, and dried at 80° to 100°C. Thereafter curing is carried out for 4½ at 160°C.

The fabrics are rinsed for 5 minutes in a detergent solution which contains 4 g/l of sodium carbonate in 2 g/l of a condensation product of 1 mol of p-tert.-nonylphenol and 9 mols of ethylene oxide.

A part of these fabrics is now washed 5 times or 10 times for 30 minutes in a solution at 60°C which contains 2 g of anhydrous sodium carbonate and 5 g of soap per litre of water (= SNV—3 wash).

The individual pieces of fabric are then tested for their flameproof character (DIN 53,906 vertical test, 12 seconds ignition time). The results of this test are summarised in Table IV below.

uptake) and dried at 80° to 100°C. Thereafter curing is carried out for 4½ minutes at 160°C. The fabrics are rinsed for 5 minutes at 60°C in a detergent solution which contains 4 g/l of sodium carbonate and 2 g/l of a condensation product of 1 mol of nonylphenol and 9 mols of ethylene oxide. Thereafter the fabric is rinsed and dried.

A part of these fabrics is now washed 5 times or 10 times for 30 minutes at 60°C in a solution which contains 2 g of anhydrous sodium carbonate and 5 g of soap per litre (= SNV—3 wash).

The individual pieces of fabric are then tested for their flameproof character (DIN 53,906 vertical test, 8 or 10 seconds ignition time). The results are summarised in Table VI below.

percent SC = Solids content in percent
percent PC = Phosphorus content in percent.

TABLE III

| Constituents (in g./l.) | Treated with liquor | | | | | | | | | | |
|---|---|---|---|---|---|---|---|---|---|---|---|
| | I | II | III | IV | V | VI | VII | VIII | IX | X | XI |
| THPC, 80% | 330 | 330 | 330 | 330 | 350 | 350 | 330 | 330 | 330 | 330 | 330 |
| Product A, 100% | 92 | 92 | 92 | 89 | 67 | 67 | 92 | 92 | 89 | | |
| 3-(dimethylphosphono)-propionic acid methylolamide, 80% | | | | | | | | | | 125 | 125 |
| Tris-2,3-dibromopropylphosphate | 73 | 73 | 73 | 71 | 133 | 83 | 73 | 73 | 71 | | |
| Dimethylolmelamine | 33 | 33 | 33 | 30 | 30 | 40 | 33 | 33 | 36 | 42 | 42 |
| Urea | | | | 30 | 30 | | | 30 | | | 30 |
| $H_3PO_4$, 85% | 5.5 | | | | | | | | | | |
| Triethanolamine | | 30 | | | | | | | | | |
| $Na_3PO_4$ | | | | + | | + | | | + | + | + |
| pH of the liquor | 2.5 | 4.8 | 4.8 | 5.5 | 5.5 | 5.5 | 3.8 | 3.7 | 5.5 | 5.5 | 5.5 |
| G./l.: | | | | | | | | | | | |
| P | 57.5 | 57.5 | 57.5 | 57 | 69.5 | 57.5 | 57.5 | 57.5 | 57 | 57.5 | 57.5 |
| N | 24 | 24 | 38 | 36 | 20 | 24 | 24 | 38 | 22 | 24 | 38 |
| Br | 57.5 | 50.5 | 50.5 | 49 | 92 | 50.5 | 50.5 | 50.5 | 49 | | |

TABLE IV

| Flameproof character | Untreated | Treated with liquor | | | | | | | | | | |
|---|---|---|---|---|---|---|---|---|---|---|---|---|
| | | I | II | III | IV | V | VI | VII | VIII | IX | X | XI |
| After rinse: | | | | | | | | | | | | |
| Ignition time, sec. | Burns | 0 | 0 | 0 | 0 | 0 | 0 | 0 | 0 | 0 | 0 | 0 |
| Tear length, cm | | 10 | 8 | 10.5 | 8.5 | 12 | 11.5 | 13 | 10 | 12.5 | 11.5 | 10 |
| After 5×SNV-3: | | | | | | | | | | | | |
| Ignition time, sec. | do | 0 | 0 | 0 | 0 | 0 | 0 | 0 | 0 | 0 | 0 | 0 |
| Tear length, cm | | 10 | 10.5 | 12 | 10 | 9 | 11.5 | 8 | 11.5 | 12 | 13 | 10 |
| After 10×SNV-3: | | | | | | | | | | | | |
| Ignition time, sec. | do | 0 | 0 | 0 | 0 | 0 | 0 | | | | | |
| Tear length, cm | | 9 | 11 | 8.5 | 9.5 | 8.5 | 10.5 | | | | | |

Example 14

An undyed 50:50 polyester-cotton fabric is padded with liquors I to XI of Table V below (80 percent liquor b. The procedure indicated under (a) is followed, but using a 67:33 polyester-cotton fabric. Tables VII and VIII contain the results.

TABLE V

| Constituents (amounts in g./l.) | Percent SC | Percent PC | Treated with liquor | | | | | | | | | | |
|---|---|---|---|---|---|---|---|---|---|---|---|---|---|
| | | | I | II | III | IV | V | VI | VII | VIII | IX | X | XI |
| THPC | 80 | 13 | 330 | 330 | 330 | 330 | 330 | 330 | 330 | 330 | 330 | 330 | 330 |
| Product B | 60 | 6.6 | 222 | | | | | | | | | | |
| Product C | 72 | 11 | | 133 | | | | | | | | | |
| Product D | 100 | 13.9 | | | 105 | | | | | | | | |
| Product E | 100 | 12.3 | | | | 119 | | | | | | | |
| Product F | 80 | 10.2 | | | | | 144 | | | | | | |
| Product G | 100 | 11.5 | | | | | | 128 | | | | | |
| Product H | 100 | 12.8 | | | | | | | 115 | | | | |
| Product I | 82 | 9.6 | | | | | | | | 153 | | | |
| Product K | 100 | 11.7 | | | | | | | | | 125 | | |
| Product L | 100 | 12.8 | | | | | | | | | | 115 | |
| 3-(dimethylphosphono)-propionic acid-N-methylolamide | 80 | 11.7 | | | | | | | | | | | 125 |
| Dimethylolmelamine | | | 42 | 42 | 42 | 42 | 42 | 42 | 42 | 42 | 42 | 42 | 42 |
| Adduct of p-tert. nonylphenol and 9 mols of ethylene oxide | | | 1 | 1 | 1 | 1 | 1 | 1 | 1 | 1 | 1 | 1 | 1 |
| pH of the liquor, adjusted with Na₃PO₄ | | | 5.5 | 5.5 | 5.5 | 5.5 | 5.5 | 5.5 | 5.5 | 5.5 | 5.5 | 5.5 | 5.5 |
| G./l.: | | | | | | | | | | | | | |
| P | | | 57.5 | 57.5 | 57.5 | 57.5 | 57.5 | 57.5 | 57.5 | 57.5 | 57.5 | 57.5 | 57.5 |
| N | | | 24 | 24 | 24 | 27.5 | 30.5 | 30.5 | 30.5 | 24 | 30.5 | 24 | 24 |

TABLE VI

| Flameproof character | Untreated | Treated in liquor | | | | | | | | | | |
|---|---|---|---|---|---|---|---|---|---|---|---|---|
| | | I | II | III | IV | V | VI | VII | VIII | IX | X | XI |
| After rinse (ignition time 8 seconds): | Burns | | | | | | | | | | | |
| Burning time (seconds) | | 0 | 0 | 0 | 0 | 0 | 0 | 0 | 0 | 0 | 0 | 0 |
| Tear length, cm | | 11.5 | 12 | 11 | 11.5 | 10.5 | 11.5 | 9.5 | 10 | 10.5 | 10 | 11 |
| After 5×SNV-3 (ignition time 8 seconds): | do | | | | | | | | | | | |
| Burning time (seconds) | | 0 | 0 | 0 | 0 | 0 | 0 | 0 | 0 | 0 | 0 | 0 |
| Tear length, cm | | 13 | 13 | 13 | 12.5 | 13 | 12 | 10 | 11 | 10 | 13 | 10 |
| After 10×SNV-3 (ignition time 10 seconds): | do | | | | | | | | | | | |
| Burning time (seconds) | | 0 | 0 | 0 | | 0 | 0 | 0 | 0 | 0 | | 0 |
| Tear length, cm | | 13 | 13 | 12 | | 13 | 11 | 8 | 12 | 12 | | 10 |

TABLE VII

| Flameproof character | Untreated | Treated with liquor | | | | | | | | | | |
|---|---|---|---|---|---|---|---|---|---|---|---|---|
| | | I | II | III | IV | V | VI | VII | VIII | IX | X | XI |
| After rinse (ignition time 10 seconds): | Burns | | | | | | | | | | | |
| Burning time (seconds) | | 0 | 0 | 0 | 0 | 0 | 0 | 0 | 0 | 0 | 0 | 0 |
| Tear length, cm | | 12 | 12 | 13 | 13 | 14 | 13 | 13 | 13 | 11 | 12 | 12 |

TABLE VIII

| Flameproof character | Untreated | Treated with liquor | | | | | | | |
|---|---|---|---|---|---|---|---|---|---|
| | | I | II | V | VII | VIII | IX | X | XI |
| After 5×SNV-3 (ignition time 10 seconds): | Burns | | | | | | | | |
| Burning time (seconds) | | 0 | 0 | 0 | 0 | 0 | 0 | 0 | 0 |
| Tear length, cm | | 13 | 13 | 12.5 | 12.5 | 10 | 13 | 13 | 12 |

Example 15

The procedure described in Example 14 is followed (50:50 or 67:33 polyester-cotton fabric), but various aminoplast precondensates (component 3) are used. The following aminoplast precondensates are employed:

Product 1: Dimethylolmelamine
Product 2: Hexamethylolmelamine-dimethyl-ether
Product 3: Hexamethylolmelamine
Product 4: Dimethylolurea.

In addition of tris-2,3-dibromo-2-chloropropyl-phosphate (component 4) improves the flameproofing effect and the handle of the fabric. All liquors contain 57.5 g of P per litre and 17.5 g of N per litre (from the aminoplast).

The $p_H$ value is in each case 5.5 and is adjusted with $Na_3PO_4$.

SC = percent solids content
PC = percent phosphorus content
NC = percent nitrogen content.

The flameproof character is tested in accordance with DIN 53,806.

The handle ratings denote:
0 = unchanged
−1 = a trace stiffer than 0
−2 = slightly stiffer than 0
−3 = stiff
−4 = very stiff.

Table IX contains the compositions of the liquors.

TABLE IX

| Constituents (amounts in g./l.) | Percent | | | Treated with liquor | | | | |
|---|---|---|---|---|---|---|---|---|
| | SC | PC | NC | I | II | III | IV | V |
| THPC | 80 | 13 | | 330 | 330 | 330 | 330 | 330 |
| 3-(dimethylphosphono)-propionic acid-N-methylolamide | 80 | 11.7 | 5.3 | 125 | 125 | 125 | 125 | 125 |
| Product 1 | 100 | | 41.5 | 42 | | | | 42 |
| Product 2 | 60 | | 16 | | 109 | | | |
| Product 3 | 100 | | 27.5 | | | 63.5 | | |
| Product 4 | 100 | | 23.3 | | | | 75 | |
| Tris-2,3-dibromo-2-chloropropylphosphate | 100 | | | | | | | 80 |
| Adduct of p-tert.-nonylphenol and 9 mols of ethylene oxide | | | | 1 | 1 | 1 | 1 | 1 |

Table X contains the results of testing the flameproof character, and the rating of the handle.

TABLE X

Polyester-cotton mixed fabric: 50:50=A; polyester-cotton mixed fabric: 67:33=B

| Flameproof character | Untreated | Treated with liquor | | | | | | | | | |
|---|---|---|---|---|---|---|---|---|---|---|---|
| | | I | | II | | III | | IV | | V | |
| | | A | B | A | B | A | B | A | B | A | B |
| After rinse (ignition time 12 seconds): | Burns | | | | | | | | | | |
| Burning time (seconds) | | 0 | 0 | 0 | 0 | 0 | 0 | 0 | 0 | 0 | 0 |
| Tear length, cm | | 11 | 13 | 12 | 13.5 | 13 | 13.5 | 13.5 | 13.5 | 11.5 | 12 |
| After 5×SNV-3 (ignition time 12 seconds): | do | | | | | | | | | | |
| Burning time (seconds) | | 0 | 0 | 0 | 0 | 0 | 0 | | | 0 | 0 |
| Tear length, cm | | 12.5 | 13.5 | 13 | 13.5 | 12 | 13.5 | | | 11.5 | 12 |
| Rating of handle (after rinse) | | −2¾ | −2½ | −3 | −3 | −3¼ | −3¼ | −3 | −3 | −2 | −2 |

What we claim is:

1. A process for flameproofing polyester and cellulose fibre blends comprising:
   i. Applying to said blend an aqueous preparation which contains
      1. from 180 to 320 grams per liter of a tetrakis-(hydroxymethyl)-phosphonium salt
      2. from 30 to 220 grams per liter of a product of formula $$R_1-O\diagdown_{P-CH_2-CH-CO-N}^{\diagup O} \begin{matrix} CH_2-O-(Y)_{n-1}(H)_{2-n} \\ | \\ (H)_{n-1}(CH_2OH)_{2-n} \end{matrix}$$
$$R_2-O\diagup \quad \quad X$$

wherein $n$ is 1 or 2.

$R_1$ and $R_2$ each is alkyl, alkenyl or halogenoalkyl with at most four carbon atoms, X is hydrogen or methyl and Y is alkyl with at most four carbon atoms, or hydrogen, 3. from 10 to 90 grams per liter of an aminoplast precondensate
   4. from 0 to 140 grams per liter of an aliphatic or aromatic polyhalogenated phosphoric acid trialkyl or triaryl ester,
   ii. Drying the blend treated in accordance with Step (i) and
   iii. Thereafter curing the dried blend at a temperature between about 100° and 200°C.

2. A process according to claim 1 in which component (1) is a tetrakis-(hydroxymethyl)-phosphonium halide.

3. A process according to claim 1 in which component (2) comprises a compound of formula $$R_1-O\diagdown_{P-CH_2-CH-CO-NH-CH_2-O-Y}^{\diagup O}$$
$$R_2-O\diagup \quad \quad X$$

in which $R_1$ and $R_2$ each is alkyl, alkenyl or halogenoalkyl with at most four carbon atoms, X is hydrogen or methyl and Y is hydrogen or aklyl with at most four carbon atoms.

4. A process according to claim 1 in which component (3) is the methylol or methylol alkyl ether derivative of urea, ethyleneurea or melamine.

5. A process according to claim 1 in which component (3) is a methylolmelamine or an alkylether thereof.

6. A process according to claim 1 in which component (4) is a polyhalogenated phosphoric acid trialkyl ester.

7. A process according to claim 1 in which component (4) is a polyhalogenated phosphoric acid trialkyl ester wherein said alkyl groups contain at most four carbon atoms and each alkyl group contains 2 or 3 halogen atoms.

8. A process according to claim 1 in which component (4) is tris-(2,3-dibromo-2-chloro-propyl)-phosphate or tris-(2,3-dibromopropyl)-phosphate.

9. A process according to claim 1 in which component (1) comprises a tetrakis-(hydroxymethyl)-phosphonium halide, component (2) comprises a compound of formula $$R_1-O\diagdown_{P-CH_2-CH-CO-NH-CH_2-O-Y}^{\diagup O}$$
$$R_2-O\diagup \quad \quad X$$

in which $R_1$ and $R_2$ each is alkyl, alkenyl or halogenoalkyl with at most four carbon atoms, X is hydrogen or methyl and Y is hydrogen or alkyl with at most four carbon atoms, component (3) comprises the methylol or methylolalkylether derivative of urea, ethyleneurea or melamine and component (4) comprises a polyhalogenated phosphoric acid trialkylester.

10. A process according to claim 1 in which
component (1) is tetrakis-(hydroxymethyl)-phosphonium chloride,
component (2) is a compound of the formula $$R_1-O\diagdown_{P-CH_2-CH_2-CO-NH-CH_2-O-Y}^{\diagup O}$$
$$R_2-O\diagup$$

in which Y is hydrogen or methyl and $R_1$ and $R_2$ each is methyl or ethyl component (3) is a methylolmelamine or an alkylether thereof and component (4) is a polyhalogenated phosphoric acid trialkylester wherein each alkyl group contains up to four carbon atoms and contains 2 or 3 halogen atoms.

11. A polyester and cellulose fiber mixture having a flameproof finish formed according to claim 1.

12. A process according to claim 2 in which tetrakis-(hydroxymethyl)-phosphonium chloride is used.

13. A process according to claim 3 in which Y is hydrogen or methyl, $R_1$ and $R_2$ each is methyl or ethyl and X is hydrogen.

14. A process according to claim 3 in which Y is hydrogen, X is hydrogen and $R_1$ and $R_2$ each is methyl.

15. A polyester and cellulose fiber mixture having a flameproof finish formed according to claim 9.

16. An aqueous flameproofing preparation for polyester-cellulose fiber mixtures containing as essential flameproofing components
   1. from 180 to 320 grams per liter of a tetrakis-(hydroxymethyl)-phosphonium salt,
   2. from 30 to 220 grams per liter of a product of formula

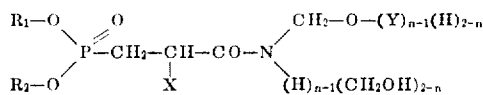

wherein $n$ is 1 or 2, $R_1$ and $R_2$ each is alkyl, alkenyl or halogenoalkyl with at most four carbon atoms, X is hydrogen or methyl and Y is alkyl with at most four carbon atoms, or hydrogen, 3. from 10 to 90 grams per liter of an aminoplast precondensate,
   4. from 0 to 140 grams per liter of an aliphatic or aromatic polyhalogenated phosphoric acid trialkyl or triaryl ester.

17. An aqueous flameproofing preparation for polyester-cellulose fiber mixtures containing as essential flame-proofing components
   1. from 180 to 320 grams per liter of a tetrakis-(hydroxymethyl)-phosphonium halide,
   2. from 30 to 220 grams per liter of a compound of the formula

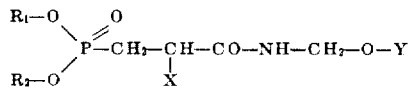

in which $R_1$ and $R_2$ each is alkyl, alkenyl or halogenoalkyl with at most four carbon atoms, X is hydrogen or methyl and Y is hydrogen or alkyl with at most four carbon atoms, 3. from 10 to 90 grams per liter of the methylol or methylolalkylether derivative of urea, ethyleneurea or melamine and
   4. from 0 to 140 grams per liter of a polyhalogenated phosphoric acid trialkylester.

18. An aqueous flameproofing preparation for polyester-cellulose fiber mixtures containing as essential flame-proofing components
   1. from 180 to 320 grams per liter of tetrakis-(hydroxymethyl)-phosphonium chloride,
   2. from 30 to 220 grams per liter of a compound of the formula

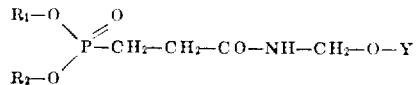

in which Y is hydrogen or methyl and $R_1$ and $R_2$ each is methyl or ethyl,
   3. from 10 to 90 grams per liter of a methylolmelamine or an alkylether thereof and
   4. from 0 to 140 grams per liter of a polyhalogenated phosphoric acid trialkylester wherein each alkyl group contains up to four carbon atoms and contains 2 or 3 halogen atoms.

* * * * *